US007574360B2

(12) United States Patent
Wu et al.

(10) Patent No.: US 7,574,360 B2
(45) Date of Patent: Aug. 11, 2009

(54) UNIT SELECTION MODULE AND METHOD OF CHINESE TEXT-TO-SPEECH SYNTHESIS

(75) Inventors: Chung Hsien Wu, Tainan (TW); Jiun Fu Chen, Changhua County (TW); Chi Chun Hsia, Kaohsiung (TW); Jhing Fa Wang, Tainan County (TW)

(73) Assignee: National Cheng Kung University, Tainan (TW)

( * ) Notice: Subject to any disclaimer, the term of this patent is extended or adjusted under 35 U.S.C. 154(b) by 467 days.

(21) Appl. No.: 11/186,876

(22) Filed: Jul. 22, 2005

(65) Prior Publication Data

US 2006/0095264 A1 May 4, 2006

(30) Foreign Application Priority Data

Nov. 4, 2004 (TW) .............................. 93133634 A

(51) Int. Cl.
*G10L 13/08* (2006.01)
*G10L 13/06* (2006.01)
*G06F 17/27* (2006.01)

(52) U.S. Cl. ............................ 704/260; 704/266; 704/9

(58) Field of Classification Search ................. 704/251, 704/257, 9, 258, 231, 255, 266, 260
See application file for complete search history.

(56) References Cited

U.S. PATENT DOCUMENTS

| | | | | |
|---|---|---|---|---|
| 6,266,637 | B1 * | 7/2001 | Donovan et al. | 704/258 |
| 7,143,036 | B2 * | 11/2006 | Weise | 704/245 |
| 2004/0059577 | A1 * | 3/2004 | Pickering | 704/260 |

OTHER PUBLICATIONS

Chou et al. ("A Chinese Text-to-Speech System Based on Part of Speech Analysis, Prosodic Modeling and Non-Uniform Units").*
Nakamura et al. "Synthesizing Context Free Grammars from Sample Strings Based on Inductive CYK Algorithm," Lecture Notes in Computer Science col. 1891/2000, pp. 186-195. 2000.*

* cited by examiner

*Primary Examiner*—Richemond Dorvil
*Assistant Examiner*—Douglas C Godbold
(74) *Attorney, Agent, or Firm*—Bacon & Thomas, PLLC.

(57) ABSTRACT

A unit selection module for Chinese Text-to-Speech (TTS) synthesis includes a probabilistic context free grammar (PCFG) parser, a latent semantic indexing (LSI) module, and a modified variable-length unit selection scheme; any Chinese sentence is firstly input and then parsed into a context-free grammar (CFG) by the PCFG parser; wherein there are several possible CFGs for every Chinese sentence, and the CFG (or the syntactic structure) with the highest probability is then taken as the best CFG (or the syntactic structure) of the Chinese sentence; the LSI module is then used to calculate the structural distance between all the candidate synthesis units and the target unit in a corpus; through the modified variable-length unit selection scheme, tagged with the dynamic programming algorithm, the units are searched to find the best synthesis unit concatenation sequence.

16 Claims, 7 Drawing Sheets

| Rule | Rule Probability |
|---|---|
| A→A | 0.20000000 |
| ADV→Cbca | 0.02803738 |
| N→N+Caa+Naa | 0.00757576 |
| Naa→Naa+Caa+Naa | 0.17543860 |
| NP→A+Nab+Nv4 | 0.00001263 |
| NP→NP+Ncda | 0.00646416 |
| NP→NP+Nce | 0.00010100 |
| S→Cbba+NP+VC2+VP | 0.00004905 |
| S→Cbaa+S | 0.00215813 |
| VP→A+Caa+VH11 | 0.00002996 |
| VP→A+VA11 | 0.00002996 |

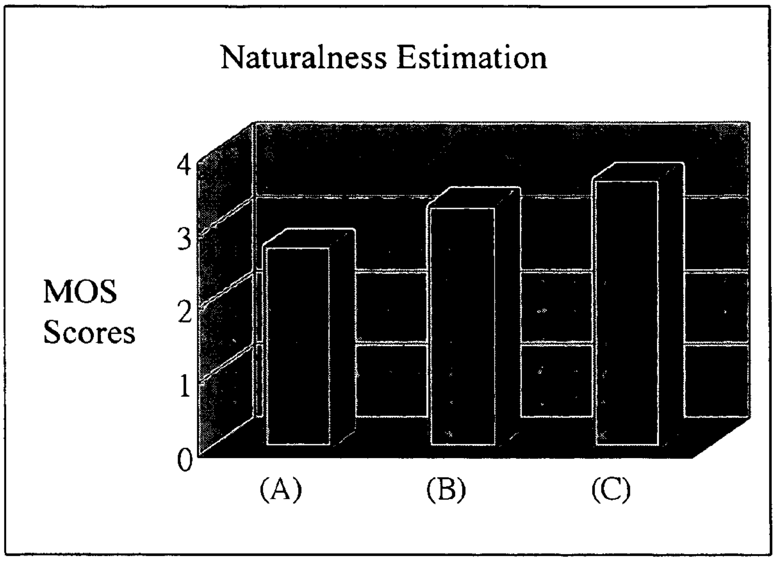

FIG. 11

| No | Example Sentences for Transcription |
| --- | --- |
| 001 | 這個茄汁排骨真好吃，不虧是我煮的菜。(This tomato sauce pork chop is really very delicious. No wonder this is my dish.) |
| 002 | 焦急的家屬，在開刀房門口傷心難過。(The anxious family members feel sorrowful in front of the operation room.) |
| 003 | 這次旅行業者太過分了，居然可以不顧旅客安全，憤怒的旅客立刻提出抗議。 (This time, the travel agency is too much. They even do not care for the safety of the tourists. These angry tourists immediately protest.) |
| 004 | 這部精采的電影，主要描述主角們，展開驚險的爭奪戰。( This wonderful movie mainly depicts the characters' involvement in exciting competitions.) |

FIG. 12

UNIT SELECTION MODULE AND METHOD OF CHINESE TEXT-TO-SPEECH SYNTHESIS

FIELD OF THE INVENTION

The present invention relates to a Chinese Text To Speech (TTS) synthesis system, and, more particularly, to an improved unit selection module and method for a Chinese Text to Speech (TTS) synthesis system.

BACKGROUND OF THE INVENTION

With the prosperous development of computer technology and the rapid growth of information-related industrial applications, computer technological development has already progressed from its original operations-orientation to its orientation on communication and information exchange. In this process, the majority of the early studies focused on the methods of how to provide the most useful and valuable information, information indexing systems, Internet search engines, and data mining technology. However, the end of information is for the users so that the end-users can engage in information exchange with the computer system by means of the most natural and direct way, so as to maximize the effectiveness to the end-users. As the most natural way for people to receive information is by means of speech, this Chinese Text-To-Speech (TTS) synthesis technology has long become an important part of man-machine communication and interaction.

Prior technology differs with the methods for generating sound waveforms. The Text-To-Speech (TTS) Systems can be classified into two major types, namely, the VOCODER (voice coder-decoder) and the Concatenative Synthesizer: the former re-calculates and then transforms the speech parameters into speech waveforms by means of the articulation model, so that the modulation range of the speech parameters becomes wider, but the quality of synthesized speech is poorer; the latter concatenates human-recorded sound fragments (synthesis units) into the waveforms of the target sentence. Although it produces a poorer speech modulation, it produces a better synthesis quality.

In these two major types of the TTS systems, the VOCODER has a longer history. In the mid-20$^{th}$ century, H. K. Dunn, George, & Noriko, et. al. proposed the Articulatory Synthesis based on human articulatory organs; Walter Lawrence and Gunnar proposed the Formant Synthesizer based on formant parameters; till 1968, Itakura and Saito applied the Linear Predictive Coding (LPC) technology, so that the LPC synthesizer evolved. However, the sound quality synthesized by these methods was usually poor. By the end of 1970's, some scholars started to directly concatenate speaker-dependent sound fragments (synthesis units), so as to generate higher quality computer synthetic sounds. In 1978, Fallside and Young proposed the word unit synthesis (or content-to-speech) architecture based on finite vocabulary; in the same year, Fujimura and Lovisn proposed a syllable-based speech synthesizer. In addition to these, a large number of methods based on the length of phones, di-phones, and tri-phones as the synthesis units were made public. Till the 21$^{st}$ century, some scholars started to use the Variable Length Unit selection scheme, and among them, the Multiform Unit proposed by Satoshi Takano and the Variable Length Unit proposed by Yi were more notable representatives.

In this field, the Chinese syllables, nowadays, are mostly used as the synthesis units, tagged with a variety of prosodic module technology, and then modulated into the rhythm of synthesized speech, after the sound fragments have been concatenated. However, the synthesis units only based on syllables definitely are unable to maintain the prosodic information above the word level. No matter how mature the prosodic module technology has become, and if the signal processing technology is unable to undergo a breakthrough, the effects of such methods are only limited.

SUMMARY OF THE INVENTION

As the prior technology was not able to effectively retain the prosodic information beyond the word level, merely by using syllables as the synthesis units, the present invention, based on the analysis of linguistics and phonetics, thus adopts a probabilistic context free grammar (PCFG) to simulate human syntactic methods, and formulates a modified variable-length unit selection scheme to remove the units that do not meet the syntactic models based on articulation syntactic methods.

It is the primary object of the present invention to provide a unit selection module and method for a Chinese Text To Speech (TTS) synthesis system, to prevent inappropriate unit generation.

Another object of the present invention is to provide a unit selection module and method for a Chinese Text To Speech (TTS) synthesis system, in which for the candidate unit distance calculation, a latent semantic indexing (LSI) module is developed to estimate the grammar structural distance of each candidate unit, and then integrate the front-end word preprocessing module and the back-end speech generation module.

This invention provides a unit selection module for a Chinese Text-To-Speech (TTS) synthesis system, comprising a probabilistic context free grammar (PCFG) parser, a latent semantic indexing (LSI) module, and a modified variable-length unit selection scheme; the PCFG parser analyzes any input Chinese sentence to obtain several possible context-free grammars (CFGs) for the Chinese sentence and then take the CFGs with the highest probability as the best CFG of the Chinese sentence; the LSI module calculates the structural distance between the candidate synthesis units and the target unit in a corpus; through the modified variable-length unit selection scheme, together with the dynamic program algorithm, the units are searched to find the best synthesis unit concatenation sequence.

This invention also provides a Unit Selection Method for a Chinese Text-To-Speech (TTS) synthesis system, comprising the following steps:

parsing the CFGs of a Chinese sentence building the target unit structure tree of the CFGs of the Chinese sentence, building a plurality of candidate unit structural trees from a speech corpus, based on the LSI module, estimate the structural distance between the target unit structural tree and the plurality of candidate unit structural trees, and through the dynamic program algorithm, the units are searched to find the best synthesis unit concatenation sequence.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 11 is a histogram depicting the experimental results of naturalness between the system disclosed in the present invention and other systems.

FIG. 12 shows the transcription example sentences for intelligibility evaluation experiments of synthesized speech.

DETAILED DESCRIPTION OF THE PREFERRED EMBODIMENTS

Figure 1:
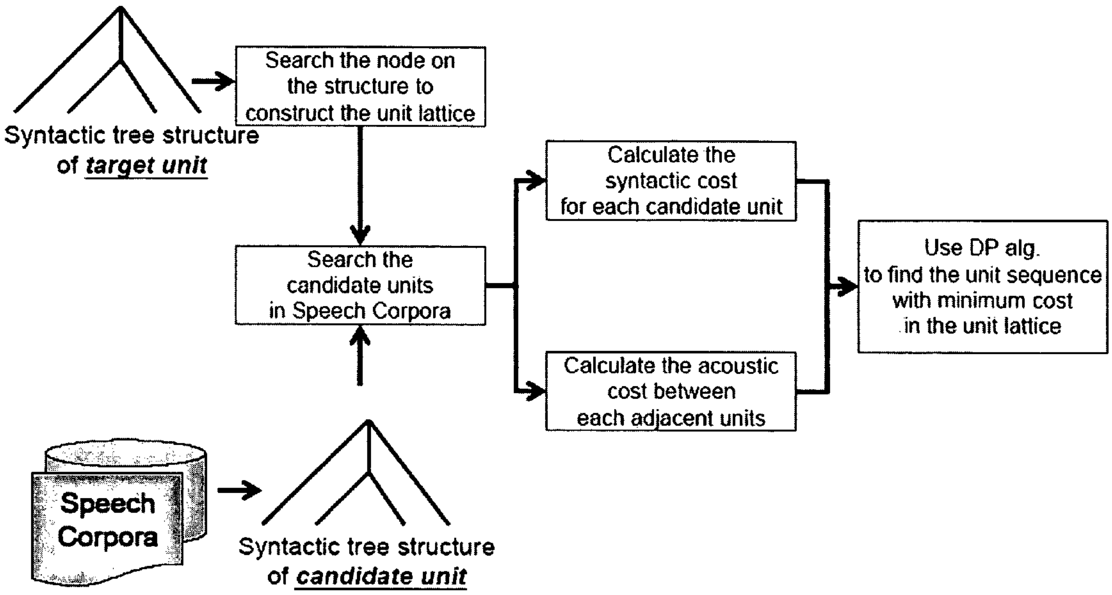
FIG. 1 shows a flowchart of the modified variable-length unit selection of the present invention.

While the invention has been fully described by way of examples and in terms of preferred embodiments, it is to be understood that before making this description, those who are familiar with the field can revise the invention described in this specification, and achieve the same effect as the present invention. Hence, an understanding of the following descriptions should be deemed a disclosure accorded with the broadest interpretation for those who are familiar with the present art, and the contents are not limited thereto.

The corpus-based concatenative Text-To-Speech (TTS) system primarily comprises three modules, namely, a Text Preprocessing module, a unit selection module, and a Speech Waveform Generation module. The present invention specially relates to a unit selection module and method.

The present invention firstly is based on human syntax and linking (liaison) methods, and then, the corresponding semantic structural tree to the text is constructed based on a probabilistic context free grammar (PCFG), and then according to the structural hierarchy, a modified variable-length unit selection scheme is designed, and finally, according to the differences in semantic structure, the best synthesis unit concatenation sequence is calculated based on the LSI.

Modified Variable-Length Unit Selection Scheme

A good corpus-based concatenative TTS synthesis system is required to have higher speech synthesis quality and also be capable of synthesizing sentences having intonation. These two results mainly depend on the selection of synthesis units. The selection of suitable synthesis units from a large corpus has been proved to have a truly beneficial effect on the quality of the synthesis system. Moreover, the types of the synthesis units include phonemes, diphones, demi-syllables, syllables, non-uniform units, etc. To the Chinese language, if it is possible to find longer words as the synthesis units, it is absolutely a better choice, because these synthesis units have already included their own prosodic information, which definitely enhances the effect on naturalness for concatenation. In the past, the variable length unit selection scheme was primarily based on the word. To every possible occurrence of word or syllable, all the possible combination methods are searched to find the best word sequence. For example, in the Chinese sentence, "中國人是一種聰明的民族"denoting "The Chinese is an intelligent race." There are a lot of possible segmentations derived from this sentence as follows:

For example: 中國人是聰明的民族

"The Chinese is intelligent race."

(1) 中國人是聰明的民族

"The Chinese is intelligent (DE) race."

Note: The Chinese character "的" is a possessive case and a functional word, and is represented by "DE" in the above sentence.

(2) 中國人是聰明的民族

"The Chinese is intelligent (DE)race."

(3) 中國人是聰明的民族

"The Chinese is intelligent (DE) race."

(4) 中國人是聰明的民族

"The Chinese is intelligent (DE) race."

(5) 中國人是聰明的民族

"The Chinese isintelligent (DE)race."

N. . . .

However, among these combinations, there are a lot of segmentations that do not meet the Chinese prosodic combinations, for example, "的民族"and "是聰明."Moreover, if it is required to search all the possible combinations, the time consumed and the dimension complexity become too great indeed.

The unit selection module of the present invention comprises a new variable-length unit selection scheme, and the flowchart of the modified variable-length unit selection scheme is shown in FIG. 1. The modified variable-length unit selection scheme of the present invention primarily considers simulating human syntactic methods. According to the prosodic and word segments (or parts of speech) of the articulation of the Chinese language, it is possible to find a suitable synthesis unit. As the human syntactic method is executed by first combining syllables into a word, and then several words are combined to form a longer word or a proper noun, which is then formed into phrases, sentences, etc. Following this rationale, the unsuitable segmentations are removed, and on a different hierarchy, hierarchical unit selection is executed for word combination methods.

The unit selection module of the present invention uses a probabilistic context free grammar (PCFG) parser or a syntactic parser, which transforms the input Chinese sentence into a hierarchical semantic tree structure, on which every terminal node represents a word, whereas every non-terminal node represents a possible long word combination. There are several advantages inherent in this method:

1. It is possible to remove unsuitable long word segmentations;
2. Suitable synthesis units are selected by using the tree structure;
3. Measuring the semantic cost between units which is based on semantic structures.

Figure 2:
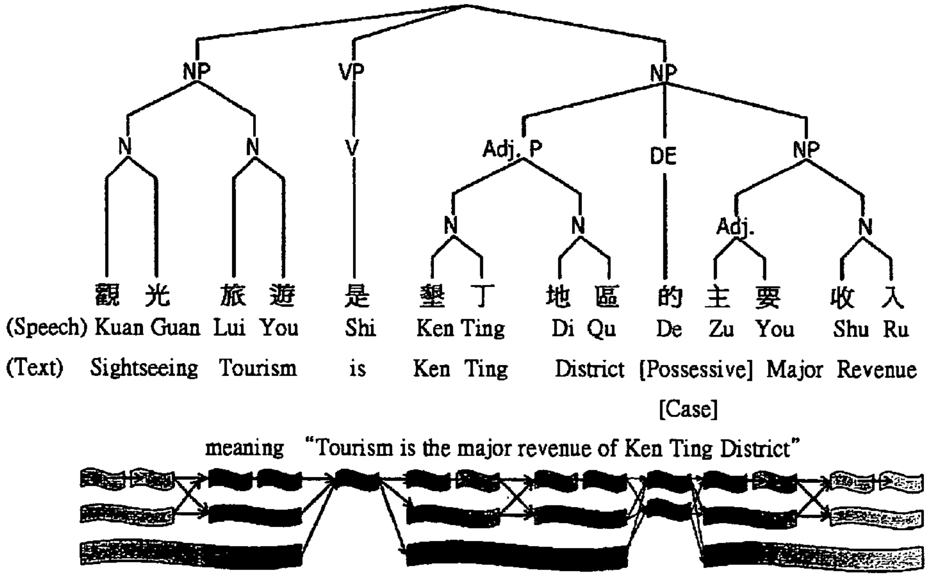
FIG. 2 shows an illustration of an example of a Chinese sentence CFG structural tree.

FIG. 2 shows an illustration of a Chinese example sentence syntactic structural tree. In FIG. 2, the upper half is the corresponding hierarchical semantic structure of the Chinese sentence "觀光旅遊是墾丁地區的主要 收入"meaning "Tourism is the major revenue of Ken Ting District," whereas the lower half shows the sequence of all the possible synthesis units.

Probabilistic Context Free Grammar (PCFG) Model of the Chinese Language

This invention parses Chinese sentences by means of the probabilistic context free grammar (PCFG). The so-called PCFG is derived from the context free grammar (CFG). The PCFG is a Stochastic Language Model (SLM), which is a language model from the perspective of probability, and one of the major purposes of the SLM is to provide sufficient probability data based on the past statistical data, and then apply them on sentence parsing so as to provide CFG results of higher accuracy. Through the probabilities of the CFG rules, the PCFG can simulate the spoken language more accurately, so that the semantic confusion can be lowered.

Given a Grammar G, start from the initial symbol $N_0$, and then generate a series of probability values for a concatenative sequence of $W_{1,T}=w_1, w_2 \ldots w_T$ as follows:

$$P\left(S \overset{*}{\Rightarrow} W_{1,T} \mid G\right) \quad \text{(Formula 1)}$$

where the arrow "⇒"denotes a sense of derivation, and the asterisk "*" on top of the arrow denotes all the derived paths. This probability value is obtained by combining all the legal derivation rules. The probability of each rule has been estimated in advance by the training corpus. Let $A \rightarrow \alpha$ be a rule, and the solution of the probability of this rule is shown as follows:

$$P(A \rightarrow \alpha_j \mid G) = \frac{C(A \rightarrow \alpha_j)}{\sum_{i=1}^{m} C(A \rightarrow \alpha_i)} \quad \text{(Formula 2)}$$

where C( ) stands for the frequency of the occurrence of each rule, whereas m stands for all the possibilities of $\alpha_i$, or in other words, the number of rules derived from A.

Figures 3, 4:
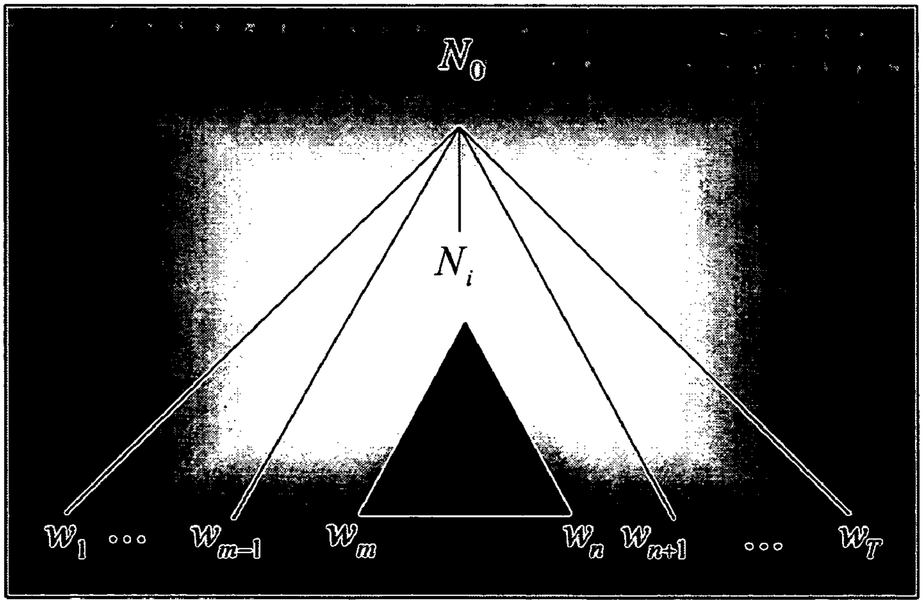
FIG. 3 shows the Tree-Bank grammar rules defined by the Chinese Knowledge Information Processing Group of the Academia Sinica and parts of the contents of the corresponding probabilities.
FIG. 4 is an illustration of the probabilistic context free grammar (PCFG) of the present invention.

In one embodiment of the present invention, the system disclosed in the present invention uses the Tree-Bank grammar rules defined by the SINICA CKIP Group and their corresponding probability values as the raw model of the PCFG module. A part of the contents has been retrieved as shown in FIG. 3. The left column shows the grammar rules whereas the right column shows the probability values obtained by the training corpus collected by the Chinese Knowledge Information Processing Group. For example, the grammar rule: Naa→Naa+Caa+Naa means that the probability of the three non-terminal term combination, Naa+Caa+Naa, decomposed from the non-terminal term Naa is 0.17543860.

The purpose of introducing the Chomsky Normal Form is to simplify and describe the PCFG module and the CFG structural distance estimation proposed by the present invention. Assume that every non-terminal term can only be decomposed into the combination of two non-terminal terms: $N_i \rightarrow N_j + N_k$ or a terminal term: $N_i \rightarrow w_l$, and the probability of the sum of all the possibilities is 1:

$$\sum_{j,k} P(N_i \rightarrow N_j N_k \mid G) + \sum_{l} P(N_i \rightarrow w_l \mid G) = 1 \quad \text{(Formula 3)}$$

Hence, according to the grammar G, start from the initial symbol $N_0$, and then deduce and derive probability values for a concatenative sequence of $W_{1,T}=w_1, w_2 \ldots w_T$ as follows:

$$P\left(N_0 \overset{*}{\Rightarrow} w_1 w_2 \cdots w_T \mid G\right) = \sum_i \left(P\left(N_i \overset{*}{\Rightarrow} W_{m,n} \mid G\right) P\left(N_0 \overset{*}{\Rightarrow} W_{1,m-1} N_i W_{n+1,T} \mid G\right)\right) \quad \text{(Formula 4)}$$

Explain it by the illustration of the probabilistic context free grammar (PCFG) as shown in FIG. 4. The first term on the right side of Formula 4 is the black portion as shown in FIG. 4. In other words, it means probability values of a word sequence: $W_{m,n}=w_m \ldots w_n$ deduced by the non-terminal term $N_i$. The second term refers to the word sequences: $W_{1,m-1}=w_1 \ldots w_{m-1}$ and $W_{n+1,T}=w_{n+1} \ldots w_T$ deduced from the initial symbol $N_0$, and moreover, and the probability value $N_i$ lies between these two word sequences. Hence, the probability derived from the initial symbol $N_0$ for a sentence (word sequence) $W_{1,T}=w_1, w_2 \ldots w_T$ can be denoted by the product of these two terms, and then all the $N_i$ are added up.

I. Inside Probability

Figure 5:
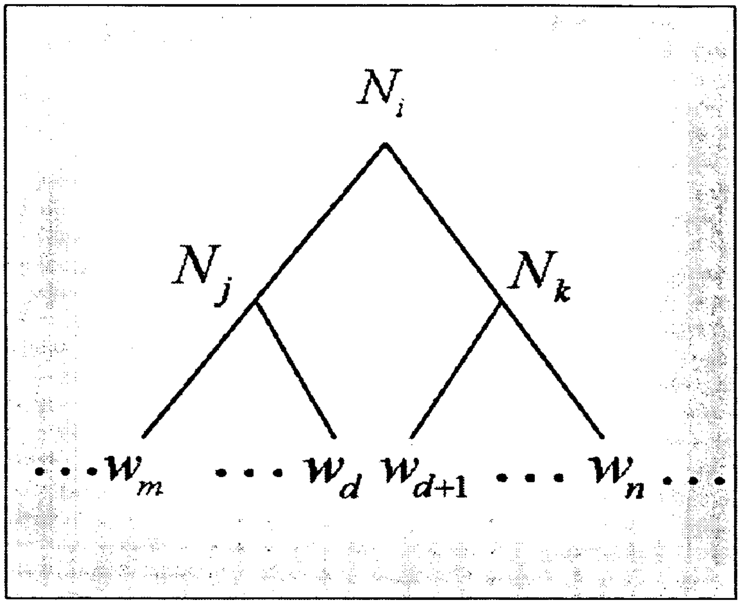
FIG. 5 is an illustration of the inside probability of the present invention.

In Formula 4, $$P\left(N_i \overset{*}{\Rightarrow} W_{m,n} \mid G\right)$$

is called the inside probability and stands for the probability values for the word sequence: $W_{m,n}=w_m \ldots w_n$ derived from a non-terminal term $N_i$. This probability value is denoted as: $\beta_i(m, n \mid G)$. The illustration of the inside probability as shown in FIG. 5 is used to explain the calculation of this formula. According to the notation of the Chomsky Normal Form, a non-terminal term can only be divided into the combination of two non-terminal terms and is denoted by the recursive notation as follows:

$$P\left(N_i \overset{*}{\Rightarrow} W_{m,n} \mid G\right) = \quad \text{(Formula 5)}$$

$$\beta_i(m, n \mid G) = \sum_{j,k} \sum_{d=m}^{n-1} P(N_i \rightarrow N_j N_k \mid G) P\left(N_j \overset{*}{\Rightarrow} W_{m,d} \mid G\right)$$

$$P\left(N_k \overset{*}{\Rightarrow} W_{d+1,n} \mid G\right) =$$

$$\sum_{j,k} \sum_{d=m}^{n-1} P(N_i \rightarrow N_j N_k \mid G) \beta_j(m, d \mid G) \beta_k(d+1, n \mid G)$$

In this invention, the tree with the highest scores will be taken as the semantic structure of the sentence. Hence, Formula 5 is revised to select the highest score from all the possibilities for building a tree structure and take it as the output probability value, as shown in the followings:

$$\hat{\beta}_i(m, n \mid G) = P\left(N_i \overset{\max}{\longrightarrow} W_{m,n} \mid G\right) = \quad \text{(Formula 6)}$$

$$\max_{\substack{j,k \\ m \le d < n}} \left( \begin{array}{c} P(N_i \rightarrow N_j N_k \mid G) \times \\ P\left(N_j \overset{\max}{\Longrightarrow} W_{m,d} \mid G\right) P\left(N_k \overset{\max}{\Longrightarrow} W_{d+1,n} \mid G\right) \end{array} \right) =$$

$$\max_{\substack{j,k \\ m \le d < n}} \left(P(N_i \rightarrow N_j N_k \mid G) \hat{\beta}_j(m, d \mid G) \hat{\beta}_k(d+1, n \mid G)\right)$$

II. Outside Probability

Figure 6:
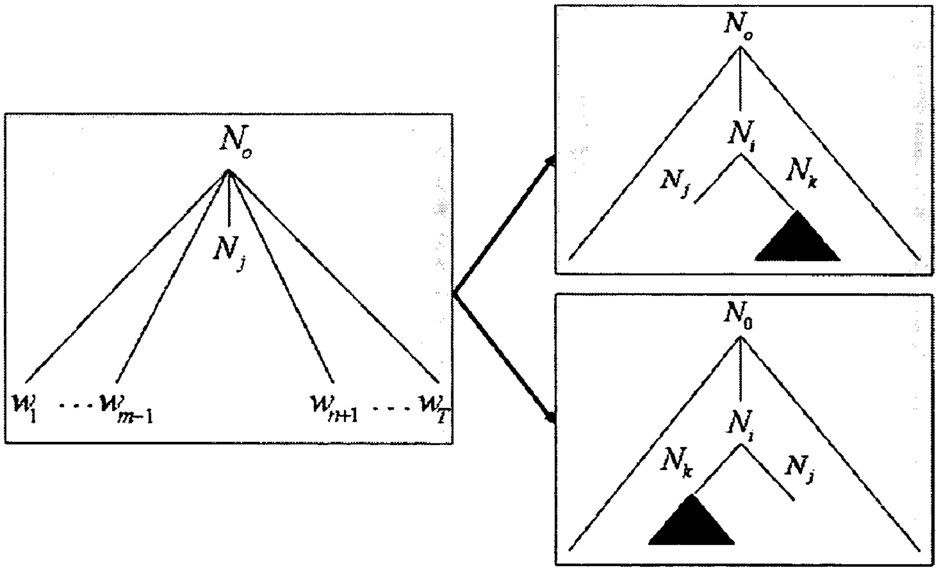
FIG. 6 is an illustration of the outside probability of the present invention.
Figure 7:
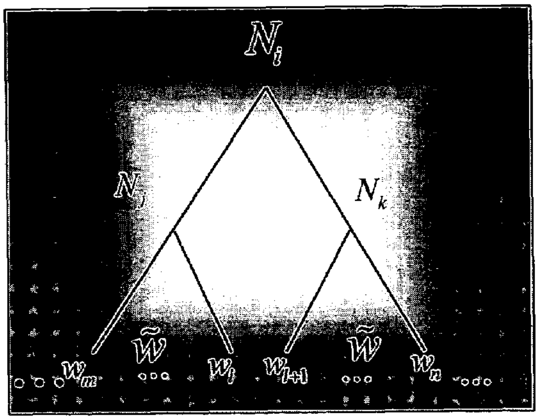
FIG. 7 is an illustration of the unit joint inside probability of the present invention.

In Formula 4, $$P\left(N_0 \overset{*}{\Rightarrow} W_{1,m-1} N_j W_{n+1,T} \mid G\right)$$

is called the outside probability and stands for the probability values derived from the two word sequences: $W_{1,m-1}=w_1 \ldots w_{m-1}$ and $W_{n+1,T}=w_{n+1} \ldots w_T$ deduced from the initial symbol $N_0$, and moreover, and the probability value $N_j$ lies between these two word sequences, is denoted as $\alpha_j(m, n|G)$, and explained by the illustration of the outside probability as shown in FIG. 6. As the non-terminal term $N_j$ may be located at the left term or the right term in the rule derived from the non-terminal term $N_i$ up one hierarchical level. Hence, according to this illustration, it is possible to denote the formula as the sum of probabilities of all the possible rules and word break points.

and is explained by the illustration of the unit joint inside probability as shown in FIG. 7.

$$P\left(N_i \overset{*}{\Rightarrow} W_{m,n}, \tilde{w} \mid G\right) = \gamma_i(m, n, \tilde{w} \mid G) = \sum_{j,k}\left(\begin{array}{l} P(N_i \to N_j N_k \mid G) \times \\ \sum_{d=m}^{n-1}\left(\begin{array}{l} \gamma_j(m, d, \tilde{w} \mid G) \\ \beta_k(d+1, n \mid G)\delta(m, d, \tilde{w}) + \\ \beta_j(m, d \mid G)\gamma_k \\ (d+1, n, \tilde{w} \mid G)\delta(d+1, n, \tilde{w}) \end{array}\right) \end{array}\right) \quad \text{(Formula 9)}$$

$$\delta(m, n, \tilde{w}) = \begin{cases} 1, \text{ if } \tilde{w} \text{ is a substring of } W_{m,n} \\ 0, \text{ otherwise} \end{cases} \quad \text{(Formula 10)}$$

$$P\left(N_0 \overset{*}{\Rightarrow} W_{1,m-1} N_j W_{n+1,T} \mid G\right) = \quad \text{(Formula 7)}$$

$$\alpha_j(m, n \mid G) = \sum_{i,k}\left(\begin{array}{l} \sum_{d=n+1}^{T_q}\left(\begin{array}{c} P(N_i \to N_j N_k \mid G) \times \\ P\left(N_0 \overset{*}{\Rightarrow} W_{1,m-1} N_j W_{d+1,T} \mid G\right) P\left(N_k \overset{*}{\Rightarrow} W_{n+1,d}\right) \end{array}\right) \\ + \sum_{d=1}^{m-1}\left(\begin{array}{c} P(N_i \to N_k N_j \mid G) \times \\ P\left(N_k \overset{*}{\Rightarrow} W_{d,m-1}\right) P\left(N_0 \overset{*}{\Rightarrow} W_{1,d-1} N_j W_{n+1,T} \mid G\right) \end{array}\right) \end{array}\right) =$$

$$\sum_{i,k}\left(\begin{array}{l} \sum_{d=n+1}^{T_q}\left(P(N_i \to N_j N_k \mid G)\alpha_i(m, d \mid G)\beta_k(n+1, d \mid G)\right) + \\ \sum_{d=1}^{m-1}\left(P(N_i \to N_k N_j \mid G)\beta_k(d, m-1 \mid G)\alpha_i(d, n \mid G)\right) \end{array}\right)$$

The tree structure with the highest probability is then estimated from Formula 8 as follows:

$$\hat{\alpha}_j(m, n \mid G) = P\left(N_0 \overset{\max}{\Longrightarrow} W_{1,m-1} N_j W_{n+1,T} \mid G\right) = \quad \text{(Formula 8)}$$

$$\max_{j,k}\left(\begin{array}{l} \max_{n+1 \le d \le T_q}\left(P(N_i \to N_j N_k \mid G)\hat{\alpha}_i(m, d \mid G)\hat{\beta}_k(n+1, d \mid G)\right), \\ \max_{1 \le d \le m-1}\left(P(N_i \to N_k N_j \mid G)\hat{\beta}_k(d, m-1 \mid G)\hat{\alpha}_i(d, n \mid G)\right) \end{array}\right)$$

III. Unit Joint Inside Probability

As the present invention uses a variable-length unit selection scheme, the candidate synthesis units selected by this system are not syllables but word sequences. Hence, for the parsing of inside probability, it is necessary to consider the required synthesis unit. In the parsing of this unit, this unit is unable to be parsed any more. Hence, it is required to find a word sequence: $W_{m,n}=w_m \ldots w_n$ derived from the non-terminal term $N_i$, and moreover, this sequence includes the joint probability values of the word sequence (synthesis unit) w. Hence, it is necessary to find $$P\left(N_i \overset{*}{\Rightarrow} W_{m,n}, \tilde{w} \mid G\right)$$

Likewise, the tree structure with the highest probability is estimated in the following formula:

$$\hat{\gamma}_i(m, n, \tilde{w} \mid G) = P\left(N_i \overset{\max}{\Longrightarrow} W_{m,n}, \tilde{w} \mid G\right) = \quad \text{(Formula 11)}$$

$$\max_{\substack{j,k \\ m \le d < n}}\left(\begin{array}{l} P(N_i \to N_j N_k \mid G)\hat{\gamma}_j(m, d, \tilde{w} \mid G) \\ \hat{\beta}_k(d+1, n \mid G)\delta(m, d, \tilde{w}), \\ P(N_i \to N_j N_k \mid G)\hat{\beta}_j(m, d \mid G) \\ \hat{\gamma}_k(d+1, n, \tilde{w} \mid G)\delta(d+1, n, \tilde{w}) \end{array}\right)$$

Context Free Grammar (CFG) Distance

Figure 8:
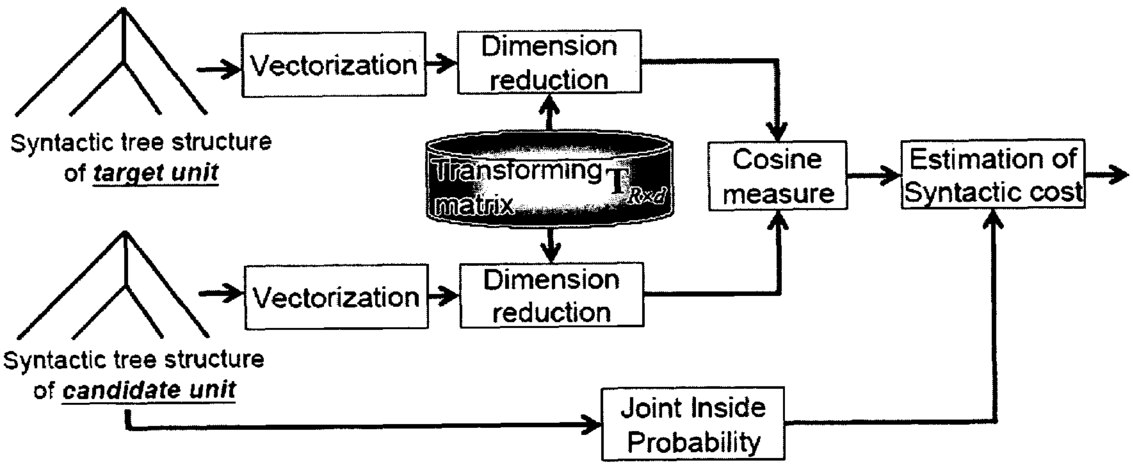
FIG. 8 is a flowchart of Content Free Grammar (CFG) structural distance estimation based on the Latent Semantic Indexing (LSI) of the present invention.

The definition of the synthesis unit cost includes two major parts, namely, the substitution cost and the concatenation cost. The present invention designs a method for estimating the CFG distance, as shown in FIG. 8. According to the syntactic tree generated by the PCFG, by means of the LSI, calculate the difference of the unit on different semantic structures.

I. Context Free Grammar (CFG) Vectorization

Transform all the corpus words into ordered vectors and then store them in a CFG data matrix $\Phi_{R,Q}$ in the dimension of R×Q, wherein R stands for the number of grammar rules in the Model G of the entire PCFG, whereas Q stands for the number of sentences in the corpus.

$$\Phi_{R\times Q}=\begin{bmatrix}\phi_{1,1} & \phi_{1,2} & \cdots & \phi_{1,Q}\\ \phi_{2,1} & \phi_{2,2} & \cdots & \phi_{2,Q}\\ \vdots & \vdots & \ddots & \vdots\\ \phi_{R,1} & \phi_{R,2} & \cdots & \phi_{R,Q}\end{bmatrix} \quad \text{(Formula 12)}$$

Every element $\phi_{r,q}$ in the matrix stands for the importance of the $r^{th}$ rule in the $q^{th}$ sentence ($S_q$). Hence, the method for estimating $\phi_{r,q}$ defined in the present invention is as follows:

$$\phi_{r,q}=(1-\epsilon_r)P(\text{Rule } r\text{: } N_i\rightarrow N_jN_k, W_{1,T}, \tilde{w}\mid G) \quad \text{(Formula 13)}$$

wherein the second term on the right of the equal (=) sign stands for the weight of the grammar rule in the CFG and can be denoted as follows:

$$P(\text{Rule } r\text{: } N_i\rightarrow N_jN_k,\ W_{1,T},\ \tilde{w}\mid G)=\frac{C(N_i\rightarrow N_jN_k,\ W_{1,T},\ \tilde{w})}{\sum_{a,b,c}C(N_a\rightarrow N_bN_c,\ W_{1,T},\ \tilde{w})} \quad \text{(Formula 14)}$$

The first term is used to determine if the classification measure of the rule in the corpus is sufficient, and is assumed to be the weight of the element in the matrix, and by means of the word entropy measurement, measure and determine if the rule has a classification measure in the corpus, as follows:

$$\varepsilon_r=-\frac{1}{\log Q}\sum_{q=1}^{Q}\left(\frac{C\left(N_i\rightarrow N_jN_k,\ W_{1,T_q}^{(q)}\right)}{\sum_{a=1}^{Q}C\left(N_i\rightarrow N_jN_k,\ W_{1,T_a}^{(a)}\right)}\log\frac{C\left(N_i\rightarrow N_jN_k,\ W_{1,T_q}^{(q)}\right)}{\sum_{a=1}^{Q}C\left(N_i\rightarrow N_jN_k,\ W_{1,T_a}^{(a)}\right)}\right) \quad \text{(Formula 15)}$$

where $W_{1,T_q}^{(q)}=w_1^{(q)}\ldots w_{T_q}^{(q)}$ stands for the $q^{th}$ sentence in the corpus; $T_q$ stands for the length of the sentence; $C(N_i\rightarrow N_jN_k, W_{1,T_q}^{(q)})$ denotes the frequency of the occurrence of the grammar rule $N_i\rightarrow N_jN_k$ in the $q^{th}$ sentence.

II. Chinese Grammar Distance

Figure 9:
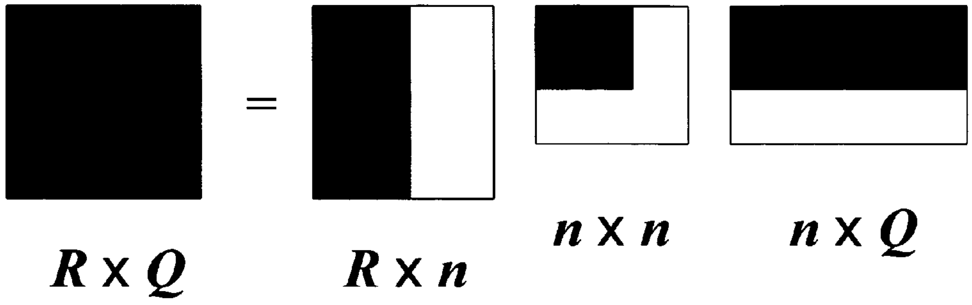
FIG. 9 is an illustration of the singular value decomposition of the present invention.

As the structural matrix of the semantic tree is very immense, it takes a lot of time in the calculation. The present invention introduces the Latent Semantic Indexing (LSI) technology in information indexing, so that this not only can find the latent relationship among rules, but also can greatly lower the vector dimension. The LSI is the variance proportion retained based on the singular matrix, after the decomposition of the singular values, so as to determine the required dimension. Then through vector transformation, all the vectors are then projected onto a space with a lower dimension and a higher classification measure. Moreover, it is also possible to effectively maintain the relationship between rules and the semantic tree, as shown in the illustration of singular value decomposition in FIG. 9.

The values are operated as follows: The present invention retains 98% of variance:

$$\Phi_{R\times Q}=\begin{bmatrix}\phi_{1,1} & \phi_{1,2} & \cdots & \phi_{1,Q}\\ \phi_{2,1} & \phi_{2,2} & \cdots & \phi_{2,Q}\\ \vdots & \vdots & \ddots & \vdots\\ \phi_{R,1} & \phi_{R,2} & \cdots & \phi_{R,Q}\end{bmatrix}=T_{R\times n}S_{n\times n}(D_{Q\times n})^T \quad \text{(Formula 16)}$$

where $n=\min(R, Q)$ $$\tilde{\Phi}_{R\times Q}=T_{R\times d}S_{d\times d}(D_{Q\times d})^T \quad \text{(Formula 17)}$$

$$\text{where } d<n,\ d=\min_k\frac{\sum_{i=1}^{k}\lambda_i}{\sum_{i=1}^{n}\lambda_i}>98\%$$

After the singular value decomposition, based on the $T_{R\times d}$ matrix, the CFG vectors of the two sentences are then projected onto the vector space of a lower dimension for comparison. Let x be the to-be-synthesized target sentence, and y be the required included candidate sentence of the required synthesis unit ($\tilde{w}$). Based on the above-mentioned methods, define the CFG distance as follows:

$$SyntacticCost\left(x^{(\tilde{w})}, y_q^{(\tilde{w})}\right)=-\log\left(\hat{\gamma}_0(1, T_q, q, \tilde{w}\mid G)\times\frac{\left((T_{R\times d})^T\times x^{(\tilde{w})}\right)\cdot\left((T_{R\times d})^T\times y_q^{(\tilde{w})}\right)}{\left\|(T_{R\times d})^T\times x^{(\tilde{w})}\right\|\times\left\|(T_{R\times d})^T\times y_q^{(\tilde{w})}\right\|}\right) \quad \text{(Formula 18)}$$

Figure 10:
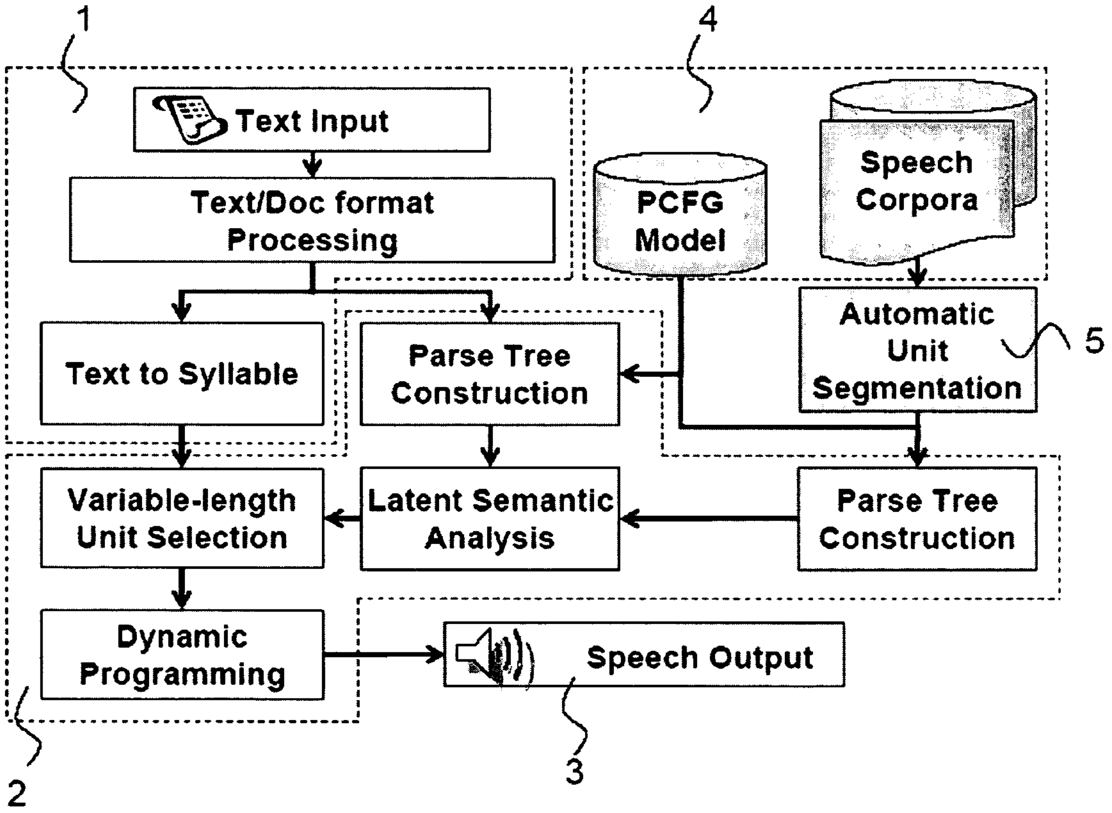
FIG. 10 is the system architecture of the Chinese computer Text-To-Speech (TTS) synthesis system of the present invention.

In an embodiment of the present invention, a Chinese computer Text-to-Speech (TTS) synthesis system comprises the unit selection module and method disclosed in the present invention, as shown in the system architecture in FIG. 10. Said Chinese computer Text-to-Speech (TTS) synthesis system comprises: a word pre-processing module 1, a unit selection module 2, speech output module 3, a speech corpus 4, and a corpus-based pre-processing module, wherein said unit selection module 2 primarily comprises a probabilistic context free grammar (PCFG) parser, a latent semantic indexing (LSI) module, a modified variable-length unit selection scheme, and a corpus-based concatenative Chinese TTS synthesizer. A Chinese sentence is firstly parsed to build its corresponding context-free grammar (CFG) by said PCFG parser, and then by means of said LSI module disclosed in the present invention, together with a large corpus 4, and an automatic speech unit-parsing module 5, a Chinese TTS synthesis system is formed based on said modified variable-length unit selection, and the latent semantic structural distance estimation.

To evaluate the performance of the present invention, the development platform of the present invention is built on a Pentium-III 2 GHz personal computer, with a 512 MB RAM, in a Windows 2000 operating system environment, together with the systems developer of Microsoft Visual C++ 6.0. The speech corpus used by the present invention is a set of 4212 Chinese sentences comprising all Chinese syllables and covering a large number of commonly used vocabulary, together with their corresponding sound files or parallel corpus corresponding to their sounds, totaling approximately 7.21 hours, with a coverage of total vocabulary of 68392 Chinese words, an average frequency of 51.79 times (There are a total number of 1342 Chinese syllables comprising four tones) for each syllable, recorded by a female announcer, with a sampling frequency of 22.05 kHz, and resolution of 16 bits. Said speech corpus is required to first automatically label the location of the nodes of every syllable by means of the speech-parsing module. The present invention uses the speech-parsing module based on the Hidden Markov Model (HMM Method.)

(1) Naturalness Evaluative Experiments of Synthesized Speech

The present invention uses the Mean Opinions Score (MOS) as the standard for evaluation. This evaluative method classifies the naturalness of output synthesized speech into five grades, namely, Excellent, Good, Fair, Poor, and Unsatisfactory, which are then assigned with a test score ranging from 5 to 1 respectively. After the subjects have heard the synthesized speech, they rate the naturalness that they perceive.

The test was conducted by synthesizing the same Chinese sentences, through the synthesis system, according to the length and the existence of the semantic cost of the fundamental synthesis units and then was taken as a control. In the experiment, ten sentences were synthesized and then listened by ten subjects (8 male, 2 female) and scored, based on the naturalness of the speech that they perceived. The average score of all the subjects was used as the standard for evaluation.

In the experiment, the difference of three systems, (A), (B), and (C) on the naturalness of synthesized speech were compared.

System (A) is a synthesis system based on syllables as the synthesis units.

System (B) is based on the modified variable-length unit, but without adding the semantic cost estimation.

System (C) is the system disclosed in the present invention.

From the results shown in FIG. 11, it is found that the method proposed by the present invention for unit selection has a substantial improvement in naturalness, compared with the synthesized speech based on syllables. Moreover, in selecting the cost, if the semantic cost is added, this makes the selected sentences better meet what are to be expressed in the target sentences, according to Chinese prosodic.

(2) Intelligibility Evaluative Experiments of Synthesized Speech

The purpose of these experiments is to determine if the intelligibility of the sentences synthesized by the method proposed by the experiments has reached its practical stage. For the experimental subjects, 10 university and graduate students (8 male, 2 female) were selected and then requested to transcribe the Chinese results they heard. Then the similarity and differences of the results with the original sentences were determined, and moreover, their transcription accuracy was also calculated. Likewise, experiments were conducted by means of the above-mentioned System (A), System (B), and the present invention (C) respectively. For every system, ten sentences were generated respectively for each of the subjects to listen and then transcribe the results. The experimental examples are shown in FIG. 12.

Figure 13:
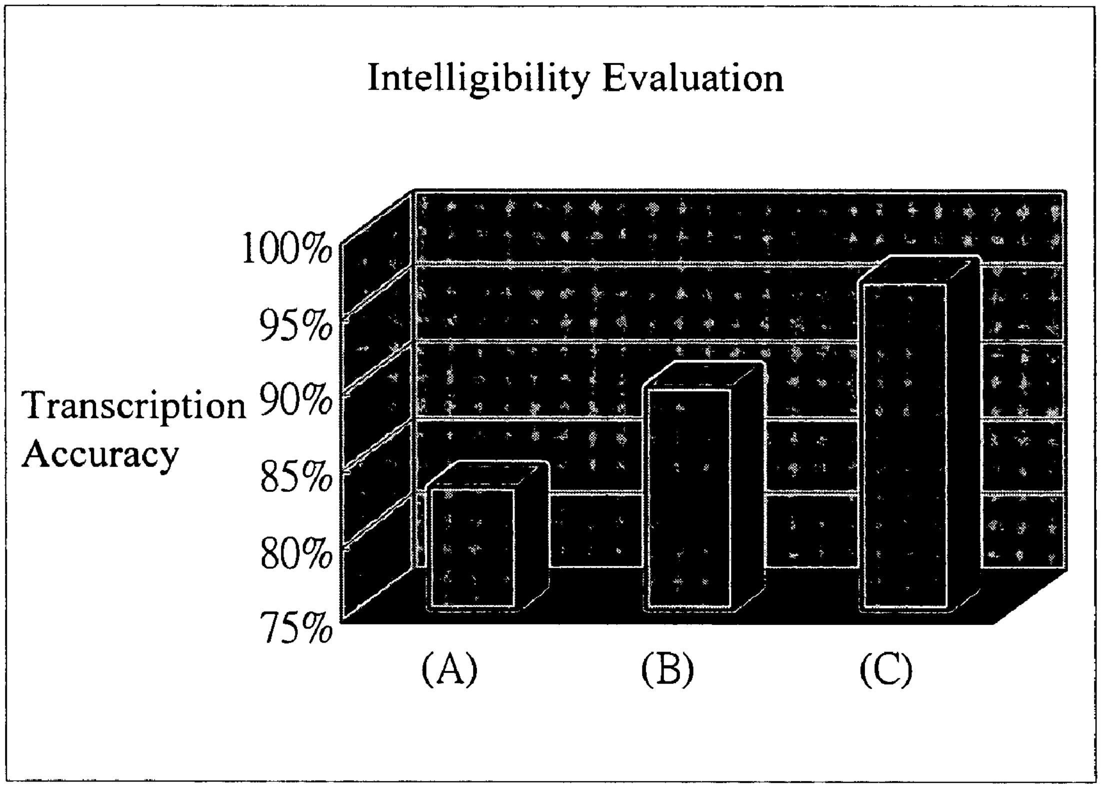
FIG. 13 is a histogram depicting the experimental results of intelligibility between the system disclosed in the present invention and other systems.

As shown in FIG. 13, although three systems, on average, have produced satisfactory intelligibility respectively: 83% (for System A), 89.5% (for System B), and 96.5% (for System C), the method of the system disclosed by the present invention is better than other general variable length unit methods. These results show that the intelligibility and practicality of the present invention are sufficient.

According to the Chinese TTS synthesis system described by the unit selection module and method of the present invention, for the selection of synthesis units, according to grammar and prosodic of the Chinese language, a variable length unit selection scheme based on the probabilistic context free grammar (PCFG) is proposed, so that it not only greatly reduces the time for searching units, and also avoids all the units that do not meet the Chinese grammar rules; in the building of CFG, the PCFG is used, and from the large number of possible syntactic structures, the tree that meets the Chinese grammars the best is selected, on the basis of statistical estimation; in the calculation of candidate unit distance, the latent semantic indexing (LSI) module is further proposed to estimate the CFG distance. On the whole, the module and method proposed by the present invention are very suitable for the applications in the corpus-based TTS concatenative synthesizer; moreover, the selection of the variable length unit maintains the prosodic information above the word level, which is a serious insufficiency of the present system based on the syllables as the synthesis units at the current stage. In addition to this, the latent semantic structural distance uses the CFG as the basis of vectors and then estimates the CFG distance between two syntactic structures. Integrating the modules and method proposed by the present invention, it is possible to experiment a Chinese TTS synthesis system and integrate related man-machine interactive communication systems, to provide men and machines with a convenient and effective environment for communication.

While the invention has been described by way of examples and in terms of preferred embodiments, it is to be understood that the invention is not limited thereto. To the contrary, it is intended to carry out various modifications and similar arrangements and procedures, and the scope of the appended claims therefore should be accorded the broadest interpretation so as to encompass all such modifications and similar arrangements and procedures.

What is claimed is:

1. A Chinese Text-To-Speech (TTS) synthesis system comprising:

a computer system implementing a word pre-processing module configured to receive a text defining a Chinese sentence, a unit selection module, a speech generation module, an automatic speech unit-parsing module, and a speech output module; and a corpus stored in database accessible by said computer system;

wherein said unit selection module comprises: a probabilistic context free grammar (PCFG) parser, a latent semantic indexing (LSI) module, and a modified variable-length unit selection scheme;

said PCFG parser parses said Chinese sentence to obtain a context free grammar (CFG) of said Chinese sentence as its target unit;

said automatic speech unit-parsing module automatically labels the location of nodes of every syllable of the Chinese sentence;

said LSI module estimates the structural distance between the candidate synthesis units and the target unit in said corpus, and conducts a vectorization for estimating the structural distance, said vectorization transforming all the corpus words into ordered vectors and storing them in a CFG data matrix in the dimension of RxQ, wherein R stands for a number of grammar rules in a grammar G of the entire PCFG, and Q stands for the number of sentences in the corpus; and through said modified variable-length unit selection scheme, tagged with a dynamic program algorithm, the units are searched to find the best synthesis unit concatenation sequence of said Chinese sentence;

wherein said speech output module is adapted to generate a synthesized speech output according to said concatenation sequence; and wherein a Chomsky Normal Form is used to simplify and describe the PCFG parser and to simplify the estimation of the structural distance.

2. The Chinese Text-To-Speech (TTS) synthesis system as claimed in claim 1, wherein said word pre-processing module comprises: word input processing and text format pre-processing.

3. The Chinese Text-To-Speech (TTS) synthesis system as claimed in claim 1, wherein said corpus comprises Chinese sentences having a large number of vocabulary and their corresponding sound files.

4. The Chinese Text-To-Speech (TTS) synthesis system as claimed in claim 1, wherein said corpus comprises Chinese sentences having a large number of vocabulary and the parallel corpus corresponding to the speech of said Chinese sentences.

5. The Chinese Text-To-Speech (TTS) synthesis system as claimed in claim 1, wherein said PCFG parser builds the candidate synthesis unit structural trees and the target unit structural tree in said corpus.

6. The Chinese Text-To-Speech (TTS) synthesis system as claimed in claim 5, wherein said LSI module conducts vector processing for the candidate synthesis unit structural trees and the target unit structural tree, to estimate the structural distance between them.

7. The Chinese Text-To-Speech (TTS) synthesis system as claimed in claim 1, wherein said speech generation module generates the best synthesis unit concatenation sequence.

8. A method for Chinese Text-To-Speech (TTS) synthesis comprising:

inputting a text defining one or more Chinese sentences;

performing a word pre-processing of said Chinese sentences;

parsing a CFG of said Chinese sentences after they have been subject to said word pre-processing;

building a target unit structural tree of said CFG;

from a corpus, building a plurality of candidate unit structural trees;

conducting a vectorization for estimating the structural distance, the vectorization transforming all the corpus words into ordered vectors and storing the them in a CEG data matrix in the dimension of RxQ, wherein R stands for the number of grammar rules in the Model G of the entire PCFG, and Q stands for the number of sentences in the corpus;

estimating a structural distance between the target unit structural tree and said plurality of candidate synthesis unit structural trees, wherein a Chomsky Normal Form is used to simplify the estimation;

searching the units so as to find the best synthesis unit concatenation sequence of said Chinese sentence; and outputting a synthesized speech according to said concatenation sequence.

9. The method for Chinese Text-To-Speech (TTS) synthesis as claimed in claim 8, comprising: an automatic speech unit-parsing module, which automatically labels the location of the nodes of every syllable of the Chinese sentence in said corpus by means of said speech-parsing module.

10. A unit selection module used in the Chinese Text-To-Speech (TTS) synthesis system comprising:

a computer system implementing a probabilistic context free grammar (PCFG) parser, a latent semantic indexing (LSI) module, and a modified variable-length unit selection scheme, and an automatic speech unit-parsing module;

wherein said PCFG parser parses a Chinese sentence to obtain the CFG of said Chinese sentence as its target unit;

said automatic speech unit-parsing module automatically labels the location of nodes of every syllable of the Chinese sentence;

said LSI module estimates the structural distance between the candidate synthesis units and the target unit in a corpus accessible by said computer system, and conducts a vectorization for estimating the structural distance, said vectorization transforming all the corpus words into ordered vectors and storing them in a CFG data matrix in the dimension of RxQ, wherein R stands for the number of grammar rules in a grammar G of the entire PCFG, and Q stands for the number of sentences in the corpus; and through said modified variable-length unit selection scheme, tagged with a dynamic program algorithm, the units are searched to find the best synthesis unit concatenation sequence of said Chinese sentence.

11. The unit selection module as claimed in claim 10, wherein said PCFG parser builds the candidate synthesis unit structural trees and the target unit structural tree in said corpus.

12. The unit selection module as claimed in claim 11, wherein said LSI module conducts vector processing for the candidate synthesis unit structural trees and the target unit structural tree, to estimate the structural distance between them.

13. The unit selection module as claimed in claim 10, wherein said PCFG parser calculates the plurality of possible CFG probabilities of said Chinese sentence, and then takes the CFG with the highest probability as the target unit.

14. A unit selection method for the Chinese Text-To-Speech (TTS) synthesis system comprising:

inputting a context free grammar (CFG) of a Chinese sentence into a computer system;

parsing the CFG of a Chinese sentence;

building the target unit structural tree of said CEG of said Chinese sentence;

from a corpus readable by said computer system, building a plurality of candidate unit structural trees;

estimating the structural distance between said target unit structural tree and a plurality of said candidate synthesis unit structural trees, wherein a Chomsky Normal Form is used to simplify the estimation of the structural distance;

searching the units to generate the best synthesis unit concatenation sequence of said Chinese sentence; and conducting a vectorization for estimating the structural distance, wherein said vectorization transforms all the corpus words into ordered vectors and stores them in a CFG data matrix in the dimension of RxQ, wherein R stands for the number of grammar rules in a grammar G of an entire PCFG, and Q stands for the number of sentences in the corpus.

15. The unit selection method as claimed in claim 14, comprising: the plurality of possible CFG probabilities of said Chinese sentence are calculated, and then the CFG with the highest probability is taken as the target unit.

16. The unit selection method as claimed in claim 14, comprising: vector processing for the candidate synthesis unit structural trees and the target unit structural tree, to estimate the structural distance between them.

* * * * *